United States Patent [19]
Liao

[11] 3,890,165
[45] June 17, 1975

[54] PASSIVATION OF MATERIALS WHICH COME INTO CONTACT WITH PEROXYGEN COMPOUNDS

[75] Inventor: Hsiang Peng Liao, Glen Burnie, Md.

[73] Assignee: FMC Corporation, New York, N.Y.

[22] Filed: Aug. 9, 1972

[21] Appl. No.: 279,071

Related U.S. Application Data

[63] Continuation-in-part of Ser. No. 27,147, April 9, 1970, abandoned.

[52] U.S. Cl......... 148/6.15 R; 252/389 A; 252/387; 264/340
[51] Int. Cl. .............................................. C23f 9/00
[58] Field of Search.... 148/6.15 R; 252/387, 389 A; 264/340

[56] References Cited
UNITED STATES PATENTS

| | | | |
|---|---|---|---|
| 2,783,132 | 2/1957 | Panepinto | 252/387 |
| 3,130,002 | 4/1964 | Fuchs | 252/387 |
| 3,275,566 | 9/1966 | Langguth | 252/389 |
| 3,342,749 | 9/1967 | Handelman et al. | 252/387 |
| 3,397,150 | 8/1968 | Burt et al. | 148/6.15 |
| 3,476,689 | 11/1969 | Newman | 252/387 |
| 3,483,133 | 12/1969 | Hatch et al. | 252/387 |
| 3,507,807 | 4/1970 | Palikko | 252/389 A |
| 3,615,912 | 10/1971 | Dittel et al. | 148/6.15 |
| 3,699,052 | 10/1972 | Petrey et al. | 148/6.15 |
| 3,723,162 | 3/1973 | Leontaritis et al. | 148/6.15 |
| 3,767,476 | 10/1973 | Wagner et al. | 148/6.15 |

Primary Examiner—Charles E. Van Horn
Assistant Examiner—Jerome W. Massie

[57] ABSTRACT

Metal surfaces that are to come into contact with peroxygen compounds, such as hydrogen peroxide or peracetic acid, are passivated, that is treated prior to use to prevent them from decomposing and discoloring the peroxygen compound. This is achieved by treatment of the metal articles and the surface with a hot solution of a polyphosphoric acid, an alkali metal polyphosphate, and/or an alkali metal organophosphate. Polyolefin surfaces are similarly passivated at room temperature and above.

4 Claims, No Drawings

PASSIVATION OF MATERIALS WHICH COME INTO CONTACT WITH PEROXYGEN COMPOUNDS

This application is a continuation-in-part of U.S. Ser. No. 27,147 filed April 9, 1970, now abandoned.

Passivation of materials and equipment for handling peroxygen compounds.

Surfaces that are to come into contact with peroxygen compounds, such as hydrogen peroxide or peracetic acid, must be treated prior to use to prevent them from decomposing the peroxygen compound. The process which makes the surface inactive to the peroxygen compound is known as passivation.

Passivation consists of treating the surface with an acid or other chemical to form on it an oxide film or other protective film. The peroxygen compound itself helps to maintain an oxide film when such a film is formed during passivation. In any event, the passivating film serves as a layer between the peroxygen compound and the surface and serves both to prevent attack by the peroxygen compound and to reduce the effect of the surface on the decomposition rate of peroxygen compounds, such as hydrogen peroxide or peracetic acid. The mechanisms of corrosion inhibition and passivation are discussed in detail in the *Encyclopedia of Chemical Technology* (Kirk-Othmer, Interscience Encyclopedia, Inc., New York 1954).

Passivation of materials and equipment that are to come into contact with hydrogen peroxide and peracetic acid is described in great detail in technical bulletins supplied by hydrogen peroxide and peracetic acid manufacturers. Becco Bulletin No. 104 (Becco Chemical Division, FMC Corporation, 1966 Revision) discloses that the various solutions and materials recommended for the cleaning and passivation of surfaces and equipment to be contacted with hydrogen peroxide or peracetic acid include detergents, trichloroethylene, perchloroethylene, hydrogen peroxide, sulfuric acid, nitric acid, hydrogen peroxide, (35%, stabilized) and hydrofluoric nitric acid mixtures. Bulletin 104 describes passivation of aluminum by degreasing the aluminum, washing with a detergent, rinsing well with distilled, deionized, or potable water, followed by treatment with nitric acid, which requires allowing the acid solution to remain in contact with the metal for 1 to 2 days, rinsing with potable water and conditioning with 35% hydrogen peroxide for 1 to 3 days. The operator must observe carefully during the conditioning with hydrogen peroxide for evidence of discoloration or decomposition of the peroxide. Stainless steel is similarly passivated by being degreased with a detergent, washed, rinsed with potable water, immersed in 70% nitric acid for 4 to 5 hours or a 2% sodium dichromate-20% nitric acid solution for one-half hour and conditioned with 35% hydrogen peroxide. Frequently, an additional treatment with a 3% hydrogen chloride-10% nitric acid aqueous solution is recommended for passivation of stainless steel. Similar treatment is recommended where the equipment will contact peracetic acid.

The complexity of passivating stainless steel tanks and the care that must be taken in passivation is illustrated by the following passivation procedure taken from Becco Bulletin No. 104.

a. Degrease by washing with a 1% detergent solution. If the tank is exceptionally greasy, it should first be degreased with trichloroethylene or perchloroethylene and then be subjected to the detergent wash. Rinse thoroughly with clean potable water.

b. Examine the tank for any welding scale, rust or other inorganic contaminant. If any is noted, the following treatment should be given.

Brush the welds with an A.I.S.I. 300 series stainless steel brush and then fill the tank with 3% hydrofluoric acid and 10% nitric acid pickling solution for 2 to 3 hours at room temperature 18°–21°C (65°–70°F). Remove and rinse with clean tap water and brush welds again with the stainless steel brush. After brushing, the debris must be cleaned out and care must be taken to insure that wire bristles are not left sticking in the welds.

c. Fill the tank with approximately 70% nitric acid for 4 to 5 hours at room temperature or with 35% nitric acid for 16 to 24 hours. Rinse with distilled water.

d. When it is possible, the tank should be "conditioned" by filling with commercial grade 35% hydrogen peroxide for 1 to 3 days before filling with high strength hydrogen peroxide.

e. During the conditioning period, the passivity of the tank surfaces can be determined by observation. If there is no steady bubbling or gas streamers noticed in the tank and the hydrogen peroxide solution is quiet and cool, the tank is said to be "compatible."

f. The 35% hydrogen peroxide may be pumped out, the tank rinsed with distilled or deionized water and concentrated hydrogen peroxide pumped into the tank.

g. On first filling with concentrated hydrogen peroxide, strict surveillance for 16 hours to 24 hours should be made to note any undue temperature rise of the tank or excessive gassing of the hydrogen peroxide.

A simple procedure for passivation of materials and equipment for handling hydrogen peroxide or peracetic acid is a principal object of this invention.

I have now discovered that surfaces, particularly stainless steel, aluminum, and polyolefin surfaces, which are to come into contact with peroxygen compounds, such as hydrogen peroxide or peracetic acid, can be effectively and simply treated prior to use to prevent decomposition or discoloration of the peroxygen compound when it contacts a surface by treating the surface with a polyphosphoric acid whose concentration is greater than 100%, an alkali metal polyphosphate or an alkali metal organo-polyphosphate as a passivation agent. For example, aluminum or stainless steel surfaces that are degreased, washed with a detergent, and then contacted with a 1 to 2% solution of an alkali metal polyphosphate or alkali metal organo-polyphosphate composition at 50°–100°C. for at least 5 minutes, generally followed by overnight contact at room temperature, are passivated the aluminum or stainless steel surface. Surprisingly, peracetic acid stored in an aluminum or stainless steel container whose surfaces have been treated by the process of this invention has greater storage stability than peracetic acid stored in a clean glass container. Polyolefin surfaces can be similarly treated with good results at lower temperatures, as low as 20°C. or even below.

The phosphorus-containing passivation agent appears to form a film on the metal or other surface, not only to serve as a layer between the peracetic acid or hydrogen peroxide and the surface, which serves to prevent attack on the surface, but also to serve as a scavenger to absorb impurities in the peracetic acid or hydrogen peroxide. This may explain why peracetic acid has been found to be more stable in a stainless steel container passivated in accordance with this invention, than in peracetic acid alone at ambient temperatures for up to 24 hours or longer. Although longer periods are not necessary, it is sometimes convenient to leave a surface in contact with the treating liquid over a period of several days, as over a week end.

The polyphosphoric acids, alkali metal polyphosphates, and alkali metal organo-polyphosphates I have found to be useful as passivation agents include, but are not limited to, polyphosphoric acid having a concentration greater than 100%, generally between 105 and 115%, alkali metal polyphosphates having P—O—P bonds and phosphorus chain lengths varying from 2 to 20, such as tetrasodium pyrophosphate and sodium hexametaphosphate, and glassy phosphates having P—O—P bonds and having phosphorus chain lengths of 6 to 40 or more, and alkali metal organo-polyphosphates having the general formula $M_5R_5(P_3O_{10})_2$ wherein M is an alkali metal and R is an alkyl group containing 1 to 10 carbon atoms, such as $Na_5(2\text{-ethylhexyl})_5(P_3O_{10})_2$ and $Na_5(capryl)_5(P_3O_{10})_2$ and the like.

The passivating agents of this invention may be used as 0.5 to 10% solutions, and preferably as 1 to 2% solutions. Higher weight percentages of the passivating agents than 10% may be used if desired. The passivating agents containing alkali metals may be dissolved in water or an organic solvent such as lower alkyl alcohols containing 1 to 8 carbon atoms, polyalcohols such as lower glycols containing 2 to 5 carbon atoms such as ethylene glycol, glycerine and so forth, ethers containing 2 to 4 carbon atoms such as dioxane, tetrahydrofuran and the like, ether alcohols with alkoxy groups of 1 to 6 carbon atoms such as mono methoxy diethylene glycol, mono ethoxy diethylene glycol and so forth, ketones containing 3 to 9 carbon atoms such as acetone, diisobutyl ketone and the like, organic acids containing 1 to 6 carbon atoms such as acetic acid, propanoic acid and so forth, esters containing 2 to 8 carbon atoms such as methyl formate, ethylacetate and so forth, amides containing 2 to 6 carbon atoms such as formamide, dimethyl formamide and so forth, amines containing 2 to 6 carbon atoms such as ethyl amine and pyridine aldehydes containing 3 to 6 carbon atoms such as propyl aldehyde, furfural and the like. Solvents are generally selected on a cost basis, thus, it is preferred to use low cost solvents such as water, acetic acid, ethylene glycol, mono methoxy diethylene glycol, mono ethyoxy diethylene glycol and so forth. So far as is knownn to the inventor any non-corrosive solvent for the alkali metal phosphate compounds can be used in practicing this invention. The solution may also contain a peroxygen compound such as peracetic acid of hydrogen peroxide.

Polyphosphoric acids are prepared by adding $P_2O_5$ to $H_3PO_4$. When aqueous $H_3PO_4$ is employed, $P_2O_5$ must be added in excess of the amount necessary to make 100% $H_3PO_4$, which has a $P_2O_5$ content of 72.4%, on an impurity-free basis. Polyphosphoric acids of almost any P—O—P chain length are theoretically possible and polyphosphoric acids with $P_2O_5$ contents of up to 85%, which are not too viscous for easy use, are available. The polyphosphoric acids having concentrations of 105 to 115% have corresponding $P_2O_5$ contents of 76% and 85.3% respectively. The polyphosphoric acids are used in solution in organic solvents as they would convert to orthophosphoric acid, $H_3PO_4$, if diluted with water.

The method of this invention is useful in passivating aluminum, aluminum alloys, and stainless steel alloys known to be useful in storing and handling hydrogen peroxide and peracetic acid. Typical aluminum alloys are 1060, 1160, 1260, 5254, and 5652, which alloys are described in detail in various ASTM Standards such as ASTM B-241(67). The wrought or forged stainless steels of the AISI (American Iron and Steel Institute) 300 Series and other non-magnetic stainless steel alloys, when passivated by the process of this invention, are useful in storing and handling peroxygen compounds.

The following examples, illustrating the novel method disclosed herein, are given without any intention that the invention be limited thereto. All parts and percentages, unless otherwise noted, are by weight. Color of the solutions was determined according to ASTM Standard D 1209 (68), Test for Color of Clear Liquids (platinum-Cobalt scale), and may hereinafter be referred to as Color, Pt-Co.

EXAMPLE I

One hundred twenty milliliter portions of a peracetic acid solution, in diisobutyl ketone, were placed in several 4-ounce wide-mouth glass bottles. The solutions were heated to 65°–70°C. and stainless steel coupons, (Type 316), 1 inch by 3 inches by ⅛ inch were immersed in the hot peracetic acid solutions. the platinum-cobalt colors (ASTM D 1209) and the concentrations of the peracetic acid solutions were determined at intervals of 0, 30 and 60 minutes after immersion of the coupons in the solutions. The peracetic acid concentrations and color ratings are set forth in Table I.

TABLE I

| Time, Min. | Comparison Blank | Stainless Steel Sample A | Stainless Steel Sample B |
|---|---|---|---|
| Initial | | | |
| Peracetic Acid, % | 10.0 | 10.0 | 10.0 |
| Color, Pt-Co. (1) | 10 | 10 | 10 |
| 30 | | | |
| Peracetic Acid, % | 9.0 | 4.5 | 4.6 |
| Color, Pt-Co | 120 | 200 | 200 |
| 60 | | | |
| Peracetic Acid, % | 8.1 | 2.4 | 2.3 |
| Color, Pt-Co | 140 | 250 | 250 |

(1) ASTM D1209

Thus, Samples A and B were similar since these two samples catalyzed the decomposition of peracetic acid to the same extent as compared to the blank, which did not contain a stainless steel coupon.

Passivation of Stainless Steel 1.2 Grams of $Na_5(2\text{-ethylhexyl})_5\text{-}(P_3O_{10})_2$ was added to 120 ml. of water and the mixture became a clear 1% by weight solution, when heated to 50°F. Stainless steel Coupon B was immersed in the 1 percent aqueous solution, further heated to 78°F. for 2 hours, and then left in the solution overnight at room temperature. The treated stainless steel coupon was then removed from the solution, rinsed once with water and dried. Stability of peracetic acid in the presence of this treated coupon, as compared with the stability of peracetic acid in the presence of the untreated coupon and a blank without a stainless steel coupon are shown in Table II.

TABLE II

| Time, Min. | Comparison Blank | Peracetic Acid in the Presence of Stainless Steel Sample A | Peracetic Acid in the Presence of Treated Stl. Steel Sample B |
| --- | --- | --- | --- |
| Initial | | | |
| Peracetic Acid, % | 9.8 | 9.8 | 9.8 |
| Color, Pt-Co | 10 | 10 | 10 |
| 30 | | | |
| Peracetic Acid, % | 8.4 | 8.4 | 8.4 |
| Color, Pt-Co | 120 | 180 | 10 |
| 60 | | | |
| Peracetic Acid, % | 7.3 | 1.8 | 8.0 |
| Color, Pt-Co | 140 | 250 | 10 |

The passivation agent appeared to form a film which served as a layer between the peracetic acid and the metal surface and thus prevented attack by the peracetic acid, and to be a scavenger that absorbed impurities in peracetic acid. The peracetic acid was more stable in the presence of the passivated stainless steel coupon than peracetic acid is alone.

EXAMPLE II

A Type 316 alloy stainless steel coupon was heated to 65°C. in an 8% by weight peracetic acid in diisobutyl ketone solution containing 2% by weight percent $Na_5(2\text{-ethylhexyl})_5\text{-}(P_3O_{10})_2$ for 6 minutes, after which the coupon was left in the treating solution at room temperature overnight. The treated coupon was then removed, rinsed with fresh peracetic acid 5 times and dried. The passivated coupon thus obtained was immersed in a fresh 10% peracetic acid solution at 65°C. for 81 hours without decomposing or discoloring the peracetic acid solution.

EXAMPLE III

A 16-ounce polyethylene bottle was filled with a 12 percent solution of peracetic acid in diisobutyl ketone containing 0.1% by weight $Na_5(2\text{-ethylhexyl})_5P_3O_{10})_2$. The solution was allowed to stand at room temperature overnight. The bottle was then rinsed with five 100-ml portions of fresh 12% peracetic acid solution in diisobutyl ketone containing no passivating agent, to remove residual passivating agent from the bottle. The passivated bottle was compared to a non-passivated bottle in the following tests in which a 15% peracetic acid solution in diisobutyl ketone was poured into the bottles and heated for 60 minutes at 60°–70°C. The color of the 12% solution of peracetic acid in diisobutyl ketone before and after the test is found in Table III.

TABLE III

Heating Peracetic Acid in a Polyethylene Container at 60–70°C.

| Time | Untreated Bottle (for Comparison) | Treated Bottle |
| --- | --- | --- |
| Initial | | |
| Peracetic Acid, % | 12.0 | 12.0 |
| Color, Pt-Co | 10 | 10 |
| 60 Minutes | | |
| Peracetic Acid, % | 9.69 | 10.35 |
| Color, Pt-Co | 120 | 10 |

EXAMPLE IV

The procedure of Example I was followed for passivating duplicated stainless steel coupons of the kind described in Example I. However, in this example the passivated coupons were placed in aqueous hydrogen peroxide solutions in glass jars, as described in Example I. The results are reported in Table IV. Example IV differs from Example I in that Example IV uses aqueous hydrogen peroxide solutions. The hydrogen peroxide content and decomposition was measured and is reported in Table IV.

TABLE IV

| Time, Min. | Stainless Steel Coupon A Untreated | Comparison Stainless Steel Coupon B Previously treated in Example I |
| --- | --- | --- |
| Initial | | |
| $H_2O_2$, % | 20.4 | 20.4 |
| 30 | | |
| $H_2O_2$, % | 19.4 | 20.3 |
| Percent Decomposed | 4.9 | 0.5 |
| 130 | | |
| $H_2O_2$, % | 17.35 | 19.72 |
| Percent Decomposed | 15.0 | 3.3 |

This example shows that stainless steel passivated by the process of this invention can be used effectively with aqueous hydrogen peroxide solutions.

EXAMPLE V

A series of one percent alkali polyphosphate solutions were tested as passivation agents for stainless steel. The stainless steel coupons tested were 1 inch by 3 inch by ⅛ inch samples as described in Example I. The procedure of Example I was utilized for testing and passivating the stainless steel samples. The test temperature, passivation agents and the peracetic acid concentrations and decomposition rates of the solutions and the color test results are set forth in Table V.

| | One Percent Alkali Polyphosphate Solutions as Passivation Agents (Temp., 60–75°C.) | | | | | |
| --- | --- | --- | --- | --- | --- | --- |
| | Comparison Examples | | Examples of the Invention | | | |
| Time Min. | Blank Peracetic Acid Alone | Stainless Steel, Not Passivated | Tetrasodium Pyrophosphate | Sodium Hexametaphosphate | Glassy Polyphosphate (2) | Glassy Polyphosphate (3) |
| Initial | | | | | | |
| Peracetic Acid, % | 10.0 | 10.0 | 10.0 | 10.0 | 10.0 | 10.0 |
| Color, Pt-Co | 10 | 10 | 10 | 10 | 10 | 10 |

—Continued

One Percent Alkali Polyphosphate Solutions as Passivation Agents (Temp., 60–75°C.)

| Time Min. | Comparison Examples | | Examples of the Invention | | | |
|---|---|---|---|---|---|---|
| | Blank Peracetic Acid Alone | Stainless Steel, Not Passivated | Tetrasodium Pyrophosphate | Sodium Hexa-metaphosphate | Glassy Polyphosphate (2) | Glassy Polyphosphate (3) |
| 30 Peracetic Acid,% | 8.4 | 3.8 | 8.9 | 8.9 | — | — |
| (1) Color, Pt-Co | | | | | | |
| 60 Peracetic Acid,% | 7.3 | 1.8 | 8.6 | 8.6 | 7.2 (70 min.) | 8.2 (70 min.) |
| Color, Pt-Co | 140 | 250 | 65 | 85 | 150 | 40 |

(1) Pt-Co color after 30 minutes was not determined.
(2) Glassy polyphosphate having P—O—P bonds with an average number of phosphorus atoms per chain of 20 to 21, disclosed in U.S. Pat. No. 3,127,238.
(3) A glassy polyphosphate having P—O—P bonds with an average number of phosphorus atoms per chain of 6–7.

EXAMPLE VI

A 316 stainless steel coupon 1 inch by 3 inch by ⅛ inch was immersed in undiluted 115% polyphosphoric acid at 70°C. for 1 hour and then at room temperature overnight. The coupon thus treated was rinsed with water 10 times and dried. The passivated coupon and a duplicate untreated coupon were tested in a solution of peracetic acid and diisobutyl ketone as described in Example I. The results of this test, which was conducted at 70°C. according to the procedure of Example I, namely, the peracetic acid solution concentrations and the final color of the peracetic acid solutions after 60 minutes at the test temperature, are set forth in Table VI.

TABLE VI

| Time Min. | Blank Peracetic Acid Alone | Stainless Steel Coupon not Passivated | Stainless Steel Coupon Passivated by Polyphosphoric Acid |
|---|---|---|---|
| Initial Peracetic Acid,% | 10.0 | 10.0 | 10.0 |
| Color, Pt-Co | 10 | 10 | 10 |
| 30 Peracetic Acid,% | 8.4 | 3.7 | 8.9 |
| 60 Peracetic Acid,% | 7.3 | 1.8 | 8.6 |
| Color, Pt-Co | 140 | 250 | 35 |

The principle of this invention has been explained and exemplified in a manner so that it can be readily practiced by those skilled in the art. The best mode contemplated by the inventor has been set forth. Clearly, within the scope of the appended claims, the invention may be practiced by those skilled in the art having this disclosure otherwise than as specifically described and exemplified herein.

EXAMPLE VII

The solubility of a typical alkali metal organo phosphate, $Na_5(2\text{-ethylhexyl})_5(P_3O_{10})_2$ was determined in a number of classes of organic solvents and water. The solvents and the solubility data were as follows:

| Organic Solvent | Solubility grams/100 grams at 50°C. |
|---|---|
| Methanol | 2 |
| Ethanol | 2.5 |
| Ethylene Glycol | 9.1 |
| Glycerine | 2 |
| Tetrahydrofuran | 2.7 |
| Mono Methoxy Diethylene Glycol | 3.9 |
| Acetone | 1 |
| Acetic Acid | 28 |
| Ethyl Acetate | 1 |
| Formamide | 2.4 |
| Pyridine | 12.2 |
| Water | >45 |

What is claimed is:

1. A method of passivating a stainless steel, aluminum or aluminum alloy surface that is to come into contact with a peroxygen compound, comprising contacting the surface with a liquid treating agent, said liquid treating agent being a solution consisting essentially of a solvent containing 0.5 to 10% by weight of a member of the group consisting of $Na_5(2\text{-ethylhexyl})_5(P_3O_{10})_2$ and $Na_5(capryl)_5(P_3O_{10})_2$, at a temperature of 50° to 100°C. for at least 5 minutes.

2. The method of claim 1 in which the treatment is carried out for a period of 5 minutes to 24 hours.

3. The method of claim 1 in which the the solutions contain water or acetic acid as solvents.

4. The method of passivating a polyethylene or polypropylene surface that is to come into contact with a peroxygen compound, comprising contacting the surface with a liquid treating agent selected from the group consisting of solutions of alkali metal polyphosphates having phosphorus-oxygen chain lengths of 2 to 20, solutions of glassy alkali metal polyphosphates having phosphorus-oxygen chain lengths of 6 to 40, solutions of alkali metal organopolyphosphates of the general formula $M_5R_5(P_3O_{10})_2$ wherein M is an alkali metal and R is an alkyl group containing 1 to 10 carbon atoms, and polyphosphoric acids having $P_2O_5$ concentrations greater than 72.4%, at a temperature of 20° to 80°C. for at least 5 minutes.

* * * * *